US012585317B2

(12) United States Patent
Gosh et al.

(10) Patent No.: US 12,585,317 B2
(45) Date of Patent: Mar. 24, 2026

(54) SINGLE USB TYPE-C CONNECTOR WITH DATA PORT MODE AND CONSOLE PORT MODE

(71) Applicant: Ciena Corporation, Hanover, MD (US)

(72) Inventors: Sujit Gosh, Gurgaon (IN); Sardeep Heda, Udaipur (IN); Himanshu Gupta, Gurgaon (IN); Tarnag Jindal, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 5 days.

(21) Appl. No.: 18/600,680

(22) Filed: Mar. 9, 2024

(65) Prior Publication Data

US 2025/0238060 A1 Jul. 24, 2025

(30) Foreign Application Priority Data

Jan. 24, 2024 (IN) .............................. 202411004902

(51) Int. Cl.
G06F 1/26 (2006.01)
G06F 13/38 (2006.01)
G06F 13/42 (2006.01)

(52) U.S. Cl.
CPC ............. G06F 1/266 (2013.01); G06F 13/382 (2013.01)

(58) Field of Classification Search
CPC .......................... G06F 1/3253; H01R 13/6471
See application file for complete search history.

(56) References Cited

U.S. PATENT DOCUMENTS

| | | | | |
|---|---|---|---|---|
| 10,635,611 | B1 * | 4/2020 | Srivastava | .......... G06F 13/4068 |
| 2018/0356873 | A1 * | 12/2018 | Regupathy | ............ G06F 1/3253 |
| 2019/0181590 | A1 * | 6/2019 | Bae | ..................... G01R 31/2813 |
| 2022/0197842 | A1 * | 6/2022 | Regupathy | .......... G06F 13/4072 |
| 2022/0376442 | A1 * | 11/2022 | Sie | ..................... H01R 13/6471 |
| 2023/0009995 | A1 * | 1/2023 | Xiao | ................... H02J 7/00036 |

OTHER PUBLICATIONS

USB 3.0 Promoter Group, "Universal Serial Bus Type-C Cable and Connector Specification," USB Type-C® Cable and Connector Specification, Release 2.3, Oct. 2023, pp. 1-424.

* cited by examiner

*Primary Examiner* — Getente A Yimer
(74) *Attorney, Agent, or Firm* — Baratta Law PLLC; Lawrence A. Baratta, Jr.

(57) ABSTRACT

Systems and methods for enabling dual functionality of a connector are provided. According to one implementation, port circuitry may be associated with a receptacle of an electrical connector configured for connection with a compatible plug. The port circuitry may include a master unit configured to one or more of transfer data to and supply power to the compatible plug when the compatible plug is inserted into the receptacle in a first orientation. Also, the port circuitry may include a slave unit configured to one or more of transfer data from and receive power from the compatible plug when the compatible plug is inserted into the receptacle in a second orientation.

20 Claims, 6 Drawing Sheets circuitry / driver

EXTERNAL
DEVICE
(SLAVE) 34

SINGLE USB TYPE-C CONNECTOR WITH DATA PORT MODE AND CONSOLE PORT MODE

TECHNICAL FIELD

The present disclosure generally relates to networking systems and methods. More particularly, the present disclosure relates to USB Type-C (USB-C) connectors that can operate in both a host (master) mode and a device (slave or peripheral) mode, depending on the orientation in which a connector plug is inserted into a connector receptacle.

BACKGROUND

Universal Serial Bus (USB) connectors have been developed and improved over the years. USB Type-A and Type-B were primarily used in the past for various types of operations, such as supplying power from a host device to a peripheral device, retrieving data from a peripheral device, upgrading a device with new software or firmware, etc. Further developments introduce the USB Type-C (USB-C) connector, which included some structural and functional improvements over Type-A and Type-B. For instance, USB-C are reversible, unlike Type-A and Type-B which clearly have top and bottom sides. That is, it does not matter which way a plug of a first USB-C connector is plugged into a receptacle of a second USB-C connector. The standard allows the pins and contacts to be connected either way and the functionality is the same regardless of the orientation.

BRIEF SUMMARY

The present disclosure is directed to connectors (e.g., USB-C) where a connector plug can be inserted into a corresponding connector receptacle in more than one way. For example, a USB-C connector allows connection in two orientations, whereby the plug can be inserted in a top-side-up orientation or can be flipped over and inserted in a top-side-down orientation. According to one implementation, port circuitry may be associated with a receptacle of an electrical connector configured for connection with a compatible plug. The port circuitry may include a master unit configured to one or more of transfer data to and supply power to the compatible plug when the compatible plug is inserted into the receptacle in a first orientation. The port circuitry may also include a slave unit configured to one or more of transfer data from and receive power from the compatible plug when the compatible plug is inserted into the receptacle in a second orientation.

In some embodiments, the receptacle and compatible plug may include a physical structure that allows the compatible plug to be inserted into the receptacle in either the first orientation or second orientation. For instance, the receptacle may include electrical contacts that conform to a USB-C layout and the compatible plug may include pins that conform to the USB-C layout. The port circuitry may be configured to utilize the master unit to operate in a master mode when the compatible plug is inserted into the receptacle and is configured to utilize the slave unit to operate in a slave mode when the compatible plug is inserted into the receptacle. The port circuitry may be configured to operate in either the master mode or slave mode without the need for a switching action by a multiplexer or other type of switch.

The port circuitry may further include a switching circuit configured to illuminate a first LED when the compatible plug is inserted into the receptacle in the first orientation (to indicate that the port circuitry is operating in a master mode) and configured to illuminate a second LED when the compatible plug is inserted into the receptacle in the second orientation (to indicate that the port circuitry is operating in a slave mode). In the master mode, the switching circuit may be configured to enable a power source to supply power to the compatible plug. The switching circuit may be configured to receive one or more Configuration Channel (CC) signals from the receptacle in accordance with a USB protocol, wherein the one or more CC signals may indicate whether the compatible plug is inserted into the receptacle in the first orientation or second orientation.

According to some embodiments, the port circuitry may further include a bridge for converting USB data from the compatible plug to a UART format for interfacing to the slave unit. The master unit may be configured to transfer data at a speed of at least 5 gigabits per second (e.g., USB 3.0 and later) and/or at least 1.5 megabits per second (e.g. USB 1.0 and later) and wherein the slave unit may be configured for data transfer at a speed of at least 1.5 megabits per second (e.g. USB 1.0 and later). The compatible plug may be connected to a cable for transmitting one or more of data and power between the electrical connector and an external device, wherein the external device may be configured to act as a slave device when the compatible plug is inserted into the receptacle in the first orientation and may be configured to act as a master device when the compatible plug is inserted into the receptacle in the second orientation. The compatible plug may be configured in some implementations on a dongle having data storage capabilities, Wi-Fi communication capabilities, and/or Bluetooth communication capabilities. Also, the electrical connector may be arranged at an exterior surface of a housing of an electronic device and the port circuitry may be arranged within the housing of the electronic device.

Furthermore, the systems and methods of the present disclosure may be directed to a port assembly, which may include a receptacle of a connector (e.g., USB-C connector) and related circuitry and/or drivers. According to additional implementations, the systems and methods of the present disclosure may be directed to an electronic device that includes a receptacle of a connector (e.g., USB-C connector) and related circuitry and/or drivers.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to electrical connectors for connecting electronic devices and/or photonic devices together to enable communication therebetween. More particularly, the present disclosure related to Universal Serial Bus (USB) connectors, specifically USB Type-C (USB-C) connectors. Again, USB-C connectors include compatible receptacles and plugs having structures such that the plugs can be inserted into the receptacles in two different orientations. For example, the USB-C plug may have a structure that might suggest to a user that it includes a top side and a bottom side, although, according to design, it can be inserted in either orientation and still function the same way. This symmetry allows a user to easily insert the plug into the corresponding receptacle and improves upon previous USB form factors (i.e., Type-A and Type-B) where there is clearly only one way that the plug can be inserted into the receptacle.

Various Types of Connectors

Figure 1A:
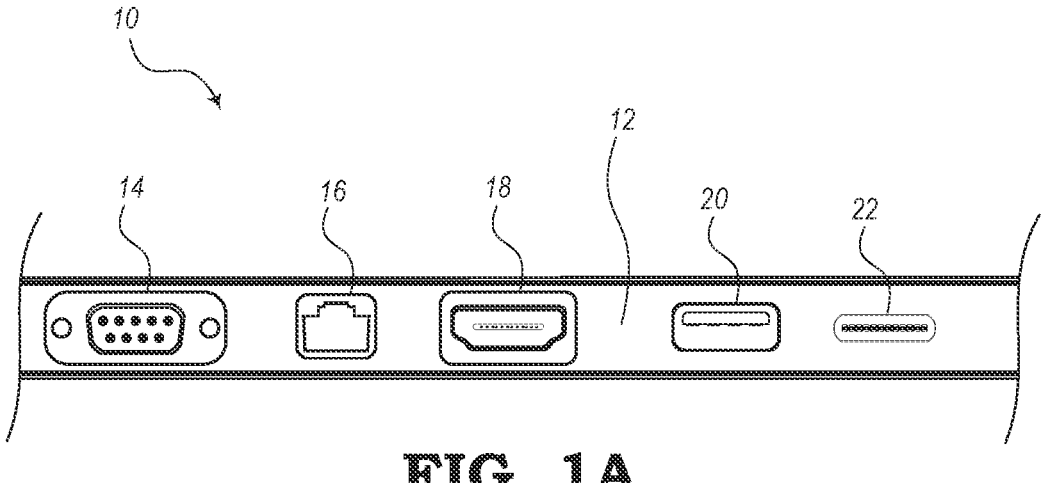
FIG. 1A is a diagram illustrating multiple types of connectors incorporated in a side panel of an electronic device, according to various embodiments.

FIG. 1A is a side view showing a portion of an electronic device 10 according to one embodiment. The electronic device 10 may be a computer, Network Element (NE), or other type of electrical and/or photonic computing or processing device. The electronic device 10, in this embodiment, includes multiple types of connectors incorporated in a side panel 12 of the electronic device 10. In this example, the electronic device 10 includes a DB9 connector 14, an RJ45 connector 16, an HDMI connector 18, a USB Type-A connector 20, and a USB-C connector 22, whereby the connectors are not necessarily drawn to scale. It should be noted that different electronic devices may have any number and type of connectors. As shown, the connectors 14, 16, 18, 20, 22 on the side panel 12 of the electronic device 10 include a "receptacle" portion (female portion) of the respective connectors, whereby corresponding male plugs may be inserted into the female receptacles to enable communication between the electronic device 10 and external devices.

Figure 1B:
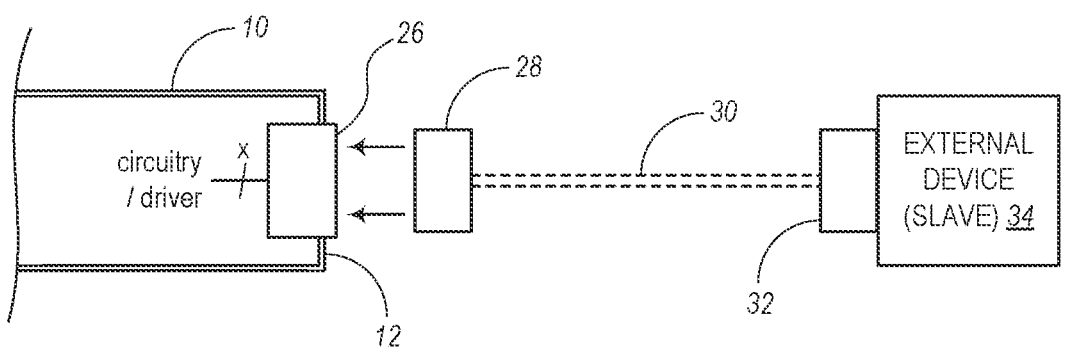
FIG. 1B is a diagram illustrating cross-sectional view of a connector incorporated in a side panel of an electronic device, according to various embodiments.

FIG. 1B is a diagram illustrating a cross-sectional view of the electronic device 10 and a connector 26 (e.g., any one of the connectors 14, 16, 18, 20, 22 shown in FIG. 1A or another type of connector). The connector 26 may be installed on a surface of a housing of the electronic device 10, such as in a manner where at least a portion of the connector accessible through the side panel 12. The connector 26 may include a plurality of pins or contacts for removable connection with pins and contacts of a corresponding male plug 28 of the same connector type. In some cases, the male plug 28 may be connected to a cable 30 for communication, via a remote connector 32, with an external device 34 (e.g., slave device).

The external device 34, for example, may be a remote computing device, a data storage device, a computer monitor, keyboard, mouse, etc. The electronic device 10 and external device 34 (or each corresponding external device when multiple connectors are used) may transmit/receive signals or data to/from each other. In some embodiments, the external device 34 may be a dongle for wireless data storage, Wi-Fi communication, Bluetooth communication, etc. In this case, the male plug 28 and external device 34 may be combined into one unit and the cable 30 and remote connector 32 may be omitted.

Universal Serial Bus (USB) Connectors

Figure 2A:
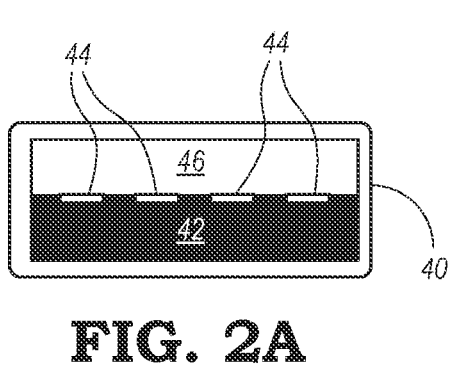
FIG. 2A is a diagram illustrating an end view of a receptacle of a Universal Serial Bus (USB) Type-A connector.
Figure 2B:
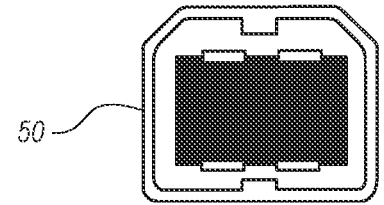
FIG. 2B is a diagram illustrating an end view of a receptacle of a USB Type-B connector.
Figure 2C:
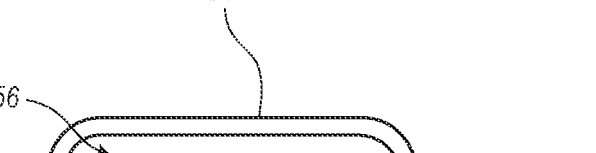
FIG. 2C is a diagram illustrating an end view of a receptacle of a USB Type-C (USB-C) connector.

FIGS. 2A-2C are diagrams showing a front end view of the female receptacle portions of different types of USB connectors. FIG. 2A is a diagram illustrating an end view of a USB Type-A connector 40, whereby an opening 42 is configured to receive a protrusion of a corresponding male plug having pins that connect to contacts 44 formed on an underside of a protrusion 46. Thus, the male plug can only be inserted in one way to enable contact between the corresponding pins and contacts. FIG. 2B is a diagram illustrating an end view of a USB Type-B connector 50. Again, because of the physical layout and structure, a male plug can only be inserted in one way into the USB Type-B connector 50.

FIG. 2C is a diagram illustrating an end view of a USB Type-C (USB-C) connector 54. It may be noted that the USB-C connector 54 includes a physical structure whereby the corresponding male plug can be inserted in two different orientations. In a first orientation, pins on a first side (e.g., top side) of the plug are configured to contact a top set of contacts 56 and pins on a second side (e.g. bottom side) of the plug are configured to contact a bottom set of contacts 58. In a second orientation (e.g., in which the plug is flipped upside-down), pins on the first side (e.g., top side) of the plug are configured to contact the bottom set of contacts 58 and pins on the second side (e.g., bottom side) of the plug are configured to contact the top set of contacts 56. According to the functionality of conventional circuitry related to the USB-C connector 54, the USB-C connector 54 is configured to operate in the same way regardless of the orientation of the connecting plug. However, as described in the present disclosure, the USB-C connector 54 may have corresponding circuitry whereby connecting the plug in one way (e.g., top-side-up) enables a first set of functions (e.g., master mode) and connecting the plug in the opposite way (e.g., top-side-down) enable a second set of functions (e.g., slave mode). Note, the USB protocol uses host and device terminology, and, as described herein, the master is the host and the slave is the device (or peripheral).

The USB Type-A connector 40 and the USB Type-B connector 50 are configured to operate according to various USB standards, such as USB 1.0, USB 1.1, USB 2.0, USB 2.0 Revised, USB 3.0, and USB 3.1. Standards USB 1.0, USB 1.1, USB 2.0, USB 2.0 Revised, USB 3.0, and USB 3.1 describe maximum signaling rates of 1.5 Mbits/s, 12 Mbits/s, 480 Mbits/s, 480 Mbits/s, 5 Gbits/s, and 10 Gbits/s, respectively. The USB Type-C (USB-C) connector 54 is configured to operating according to USB standards USB 2.0 Revised, USB 3.0, and USB 3.1 and is further configured to replace Type-A and Type-B connectors and operate according to standards USB 3.2, USB 4, USB 4 v2.0, etc. Standards USB 3.2, USB 4, USB 4 v2.0 describe maximum signaling rates of 20 Gbits/s, 40 Gbits/s, and 80 Gbits/s. For example, USB-C is described in Universal Serial Bus Type-C Cable and Connector Specification, Release 2.0, August 2019, the contents of which are incorporated by reference in their entirety.

Figure 3:
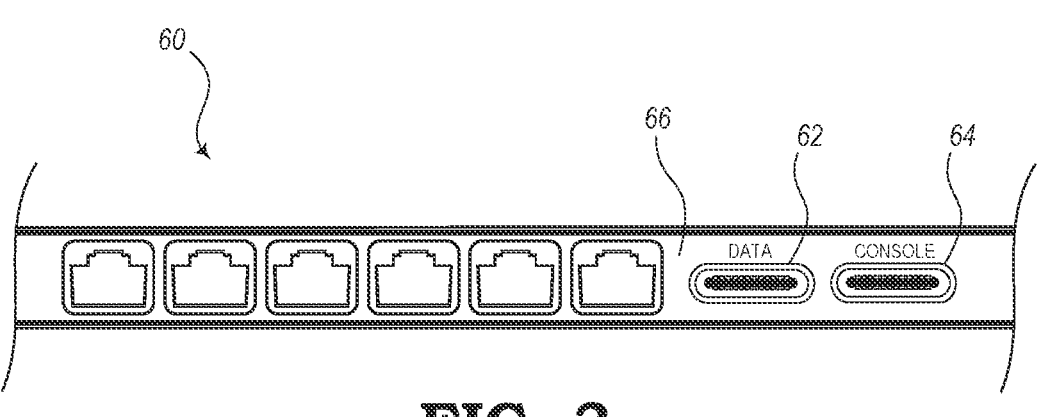
FIG. 3 is a diagram illustrating multiple connectors, including a data port USB-C connector and console port USB-C connector, incorporated in a side panel of an electronic device, according to various embodiments.

FIG. 3 is a diagram illustrating an embodiment of another electronic device 60 having another arrangement of connectors. In this embodiment, the electronic device 60 includes multiple connectors, including at least a data port USB-C connector 62 and a console port USB-C connector 64, incorporated in a side panel 66 of the electronic device 60. The data port USB-C connector 62 may include a conventional setup, whereby circuitry associated with the data port USB-C connector 62 allows the connection of a corresponding plug (in either orientation) to perform only a first set of functions (e.g., data port functions, master-type functions, etc.). Also, the console port USB-C connector 64 may include a conventional setup, whereby circuitry associated with the console port USB-C connector 64 allows the connection of a corresponding plug (in either orientation) to perform only a second set of functions (e.g., console port functions, slave-type functions, etc.).

USB-C Connector Pinout Schematic

Figures 4A, 4B:
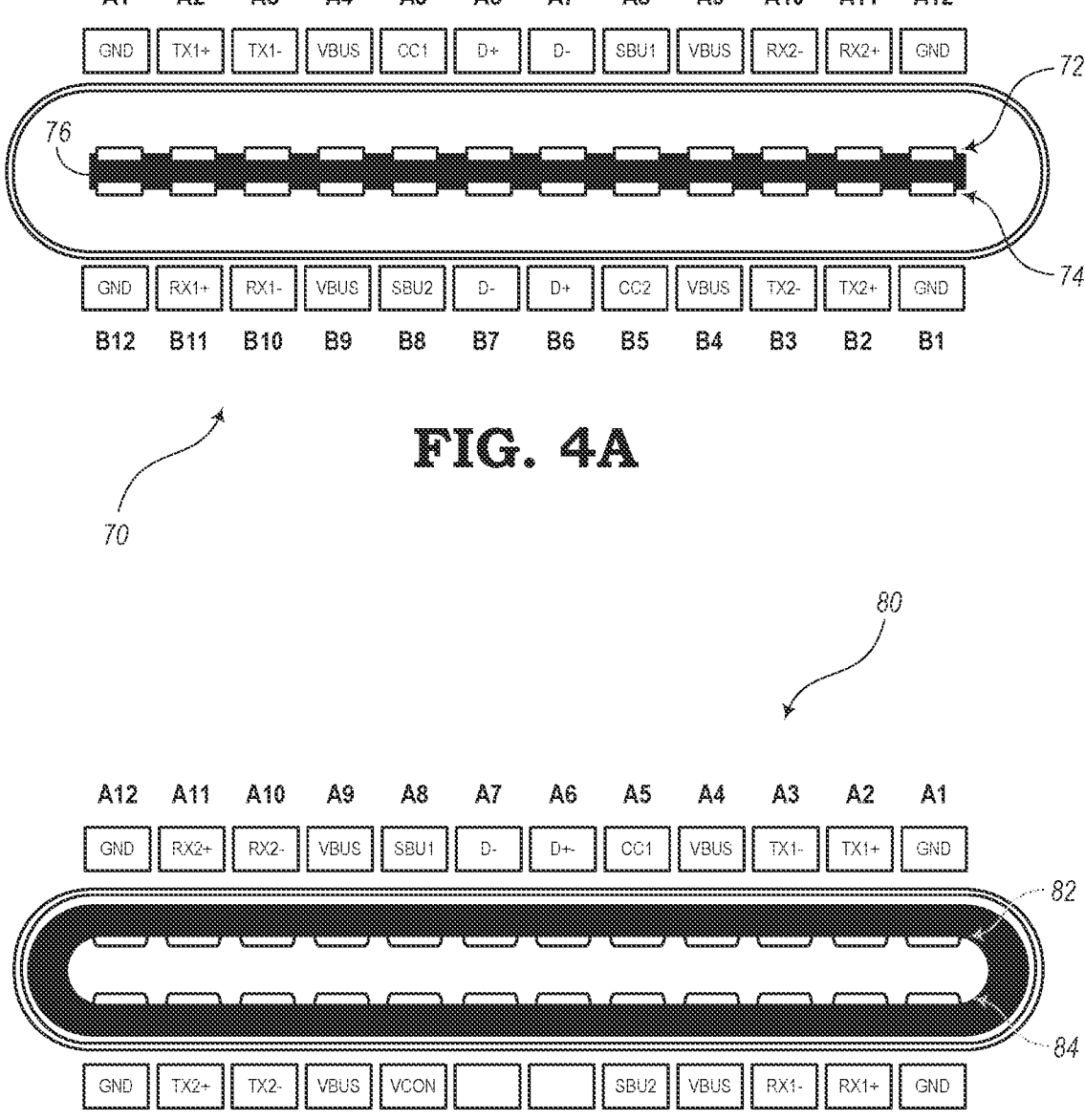
FIG. 4A is a diagram illustrating a female receptacle of a USB-C connector with contact designations, according to various embodiments.
FIG. 4B is a diagram illustrating a male plug of a USB-C connector with pin designations, according to various embodiments.

FIG. 4A is a diagram illustrating a front end view of a female receptacle 70 of a USB-C connector. Also shown in FIG. 4A are contact designations, where a top set 72 of contacts are labelled A1 to A12 (going from left to right) and a bottom set 74 of contacts are labelled B1 to B12 (going from right to left). The top set 72 of contacts are arranged on a top surface of a board 76 and the bottom set 74 of contacts are arranged on a bottom surface of the board 76. Also, the contacts in the top set 72 (from A1 to A12) include the same designation as the contacts in the bottom set 74 (from B1 to B12).

FIG. 4B is a diagram illustrating a front end view of a male plug 80 of a USB-C connector. Correspondingly, the male plug 80 includes contact designations, where a top set 82 of pins are labelled A1 to A12 (going from right to left) and a bottom set 84 of pins are labelled B1 to B12 (going from left to right). It should be noted that, in this arrangement, when the male plug 80 is inserted into the female receptacle 70, the top set 82 of pins (i.e., A1 through A12) are arranged in contact with the top set 72 of contacts (i.e., A1 through A12) and the bottom set 84 of pins (i.e., B1 through B12) are arranged in contact with the top set 74 of contacts (i.e., B1 through B12).

The following is the pin/contact layout for the female receptacle 70 and male plug 80:

| Pin | Name | Description |
|---|---|---|
| A1 | GND | Ground |
| A2 | SSTXp1 (TX1+) | SuperSpeed, $1^{st}$ pair, transmit, positive |
| A3 | SSTXn1 (TX1−) | SuperSpeed, $1^{st}$ pair, transmit, negative |
| A4 | Vbus | Bus Power |
| A5 | CC1 | Configuration Channel #1 |
| A6 | D+ | USB 2.0 pair, position 1, positive |

-continued

| Pin | Name | Description |
|---|---|---|
| A7 | D− | USB 2.0 pair, position 1, negative |
| A8 | SBU1 | Sideband Use #1 |
| A9 | Vbus | Bus Power |
| A10 | SSRXn2 (RX2−) | SuperSpeed, $4^{th}$ pair, receive, negative |
| A11 | SSRXp2 (RX2+) | SuperSpeed, $4^{th}$ pair, receive, positive |
| A12 | GND | Ground |
| B1 | GND | Ground |
| B2 | SSTXp2 (TX2+) | SuperSpeed, $3^{rd}$ pair, transmit, positive |
| B3 | SSTXn2 (TX2−) | SuperSpeed, $3^{rd}$ pair, transmit, negative |
| B4 | Vbus | Bus Power |
| B5 | CC2 | Configuration Channel #2 |
| B6 | D+ | USB 2.0 pair, position 2, positive |
| B7 | D− | USB 2.0 pair, position 2, negative |
| B8 | SBU2 | Sideband Use #2 |
| B9 | Vbus | Bus Power |
| B10 | SSRXn1 (RX1−) | SuperSpeed, $2^{nd}$ pair, receive, negative |
| B11 | SSRXp1 (RX1+) | SuperSpeed, $2^{nd}$ pair, receive, positive |
| B12 | GND | Ground |

Dedicated Data Port Circuit

Figure 5:
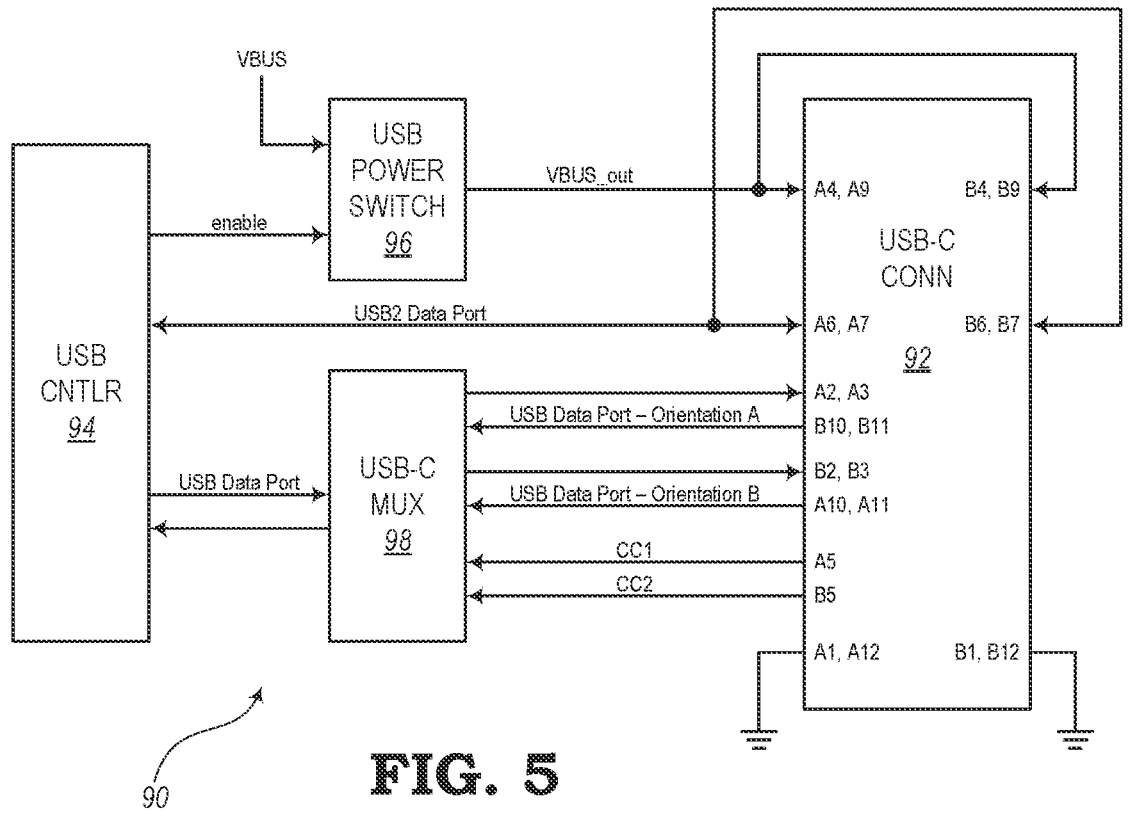
FIG. 5 is a schematic diagram of a data port of a USB-C connector for use in a master mode, according to various embodiments.

FIG. 5 is a schematic diagram of a data port circuit 90 of a USB-C connector for use in a data port or master mode. The data port circuit 90 includes a USB-C connector 92 (i.e., receptacle) for connection with a corresponding USB-C connector (i.e., plug). The data port circuit 90 further includes a USB controller 94, a USB power switch 96, and a USB-C multiplexer 98. The contacts A1-A12 and B1-B12 of the USB-C connector 92 are connected to the USB controller 94, USB power switch 96, USB-C multiplexer 98, and ground, as shown.

The first pair of contacts A2, A3 (for transmit) and second pair of contacts B10, B11 (for receive) are connected to the USB-C multiplexer 98 and are used when the plug is inserted in a first orientation ("orientation A") with the A pins on top. The third pair of contacts B2, B3 (for transmit) and fourth pair of contacts A10, A11 (for receive) are also connected to the USB-C multiplexer 98 and are used when the plug is inserted in a second orientation ("orientation B") with the B pins on top.

The Configuration Channel (CC) contacts A5, B5 are used to indicate the plug orientation. The CC signals CC1, CC2 are provided to the USB-C multiplexer 98 to select which sets of transmit and receive pairs will be used for transmitting and receiving data along the USB data port to the USB controller 94. In some embodiments, the USB data port may be configured to operate at a speed associated with any USB standards (e.g., USB 3.0, USB 3.1, USB 3.2, USB 4, USB 4 v2.0, etc.). That is, the transmission speeds may be as high as 5 Gbits/s, 10 Gbits/s, 20 Gbits/s, 40 Gbits/s, and 80 Gbits/s, respectively.

The USB power switch 96 is configured to provide VBUS power to pins A4, A9 or B4, B9, as needed, depending on the orientation. Also, USB 2.0 speeds (i.e., USB 2.0 legacy speeds) may be used for data transmission over pins A6, A7 or B6, B7, depending on the orientation.

Dedicated Console Port Circuit

Figure 6:
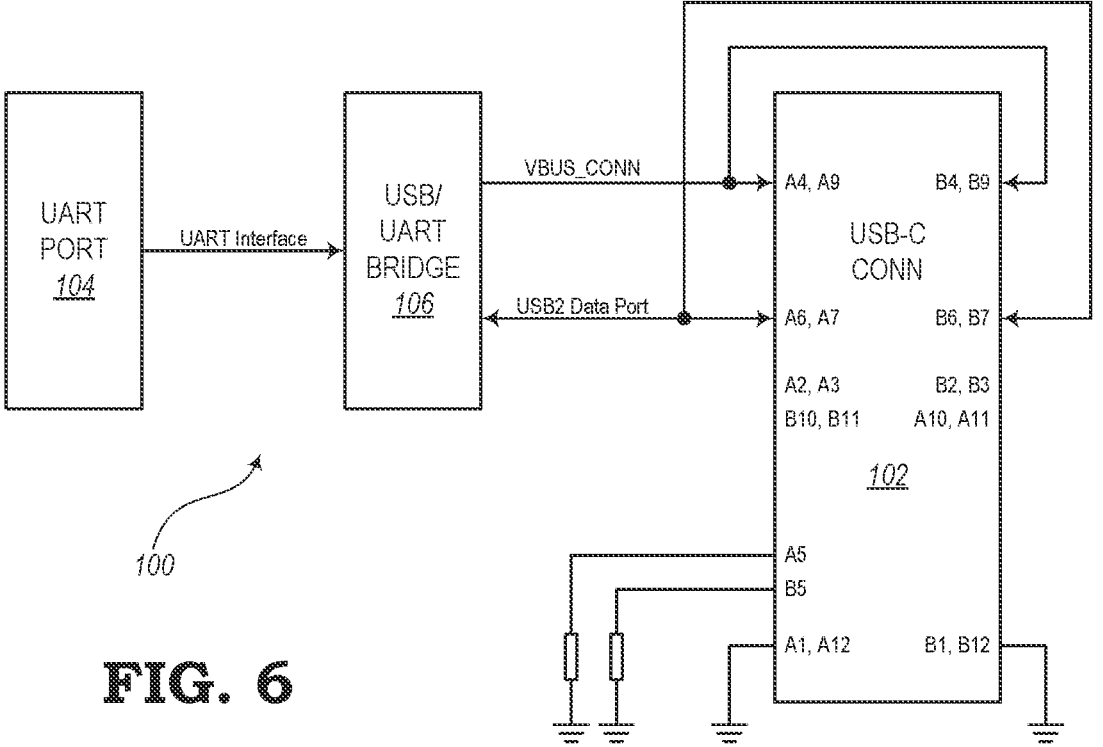
FIG. 6 is a schematic diagram of a console port of a USB-C connector for use in a slave mode, according to various embodiments.

FIG. 6 is a schematic diagram of a console port circuit 100 of a USB-C connector for use in a console port or slave mode. Again, the USB-C connector is configured to operate in the slave mode regardless of the orientation of the plug. In this arrangement, the console port circuit 100 includes a USB-C connector 102, a Universal Asynchronous Receiver/Transmitter (UART) port 104, and a USB-to-UART bridge 106. Bus power (VBUS) can be provided to the USB-to-UART bridge 106 regardless of the plug orientation via pins A4, A9 or pins B4, B9. Also, data transmission (e.g., USB 2.0) may be provided over data port via pins A6, A7 or pins B6, B7, depending on the orientation.

USB-C Circuitry with Dual Functionality

Figure 7:
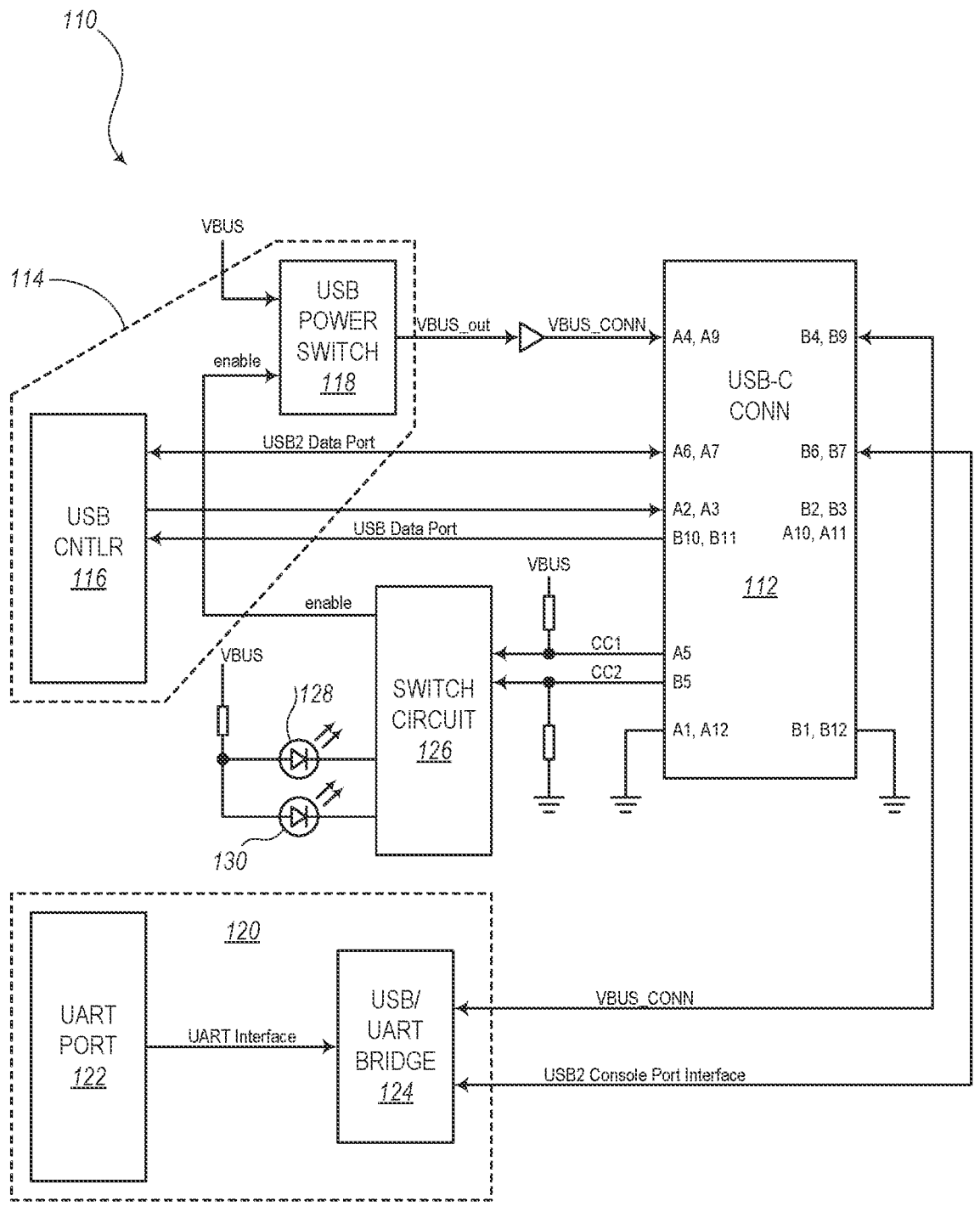
FIG. 7 is a schematic diagram of a combined data port and console port of a USB-C connector for use in both a master mode and slave mode, according to various embodiments.

FIG. 7 is a schematic diagram of port circuitry 110 according to various embodiments of the present disclosure. The port circuitry 110 includes a combined data port and console port of a USB-C connector for use in both a master mode and slave mode. The port circuitry 110 differs from conventional circuitry in that only one USB-C connector is needed for both master (data) and slave (console) operations. Also, the port circuitry 110 differs from conventional circuitry in that the orientation of the plug determines the operational mode. That is, when the plug is inserted into the USB-C connector in a first orientation (i.e., top-side-up, A1-A12 pins on top, Orientation A, etc.), the port circuitry 110 is configured to operate in the master mode. On the other hand, when the plug is inserted into the USB-C connector in a second orientation (i.e., top-side-down, B1-B12 pins on top, Orientation B, etc.), the port circuitry 110 is configured to operate in the slave mode.

As illustrated, the port circuitry 110 includes a USB-C connector 112, which may be configured as a female receptacle (e.g., female receptacle 70 of FIG. 4A) having contacts A1-A12 and B1-B12. The USB-C connector 112 allows connection with a male plug (e.g., male plug 80 of FIG. 4B) having corresponding pins A1-A12 and B1-B12.

Furthermore, the port circuitry 110 includes a master unit 114, which includes a USB controller 116 and a USB power switch 118. The USB controller 116 and USB power switch 118 may include the same or similar functionality as the USB controller 94 and USB power switch 96 shown in FIG. 5. However, the USB controller 116 is connected directly to pairs A2, A3 (i.e., first pair of SuperSpeed transmit pins) and B10, B11 (i.e., second pair of SuperSpeed receive pins) for data transport when it is known that the plug is inserted in the first (master) orientation. This connection can be direct (without the need for a multiplexer) since the orientation is known. Also, the USB power switch 118 is configured to provide power to pins A4, A9, B4 and B9 in the first orientation. In some embodiments, USB controller 116 may be configured to directly receive the third SuperSpeed transmit pair B2, B3 and fourth SuperSpeed transmit pair A10, A11 to increase the data transfer rate.

Additionally, the port circuitry 110 includes a slave unit 120, which includes a UART port 112 and a USB-to-UART bridge 124. The UART port 122 and USB-to-UART bridge 124 may include the same or similar functionality as the UART port 104 and USB-to-UART bridge 106 shown in FIG. 6. However, in the second (slave) orientation Vbus power is provided by peer end host to pins A4, A9, B4 and B9. USB power switch 118 is turned off. In some embodiments, the slave unit 120 (e.g., UART port 122 and/or USB-to-UART bridge 124) may be configured to directly receive (without a multiplexer) USB 3.0 (and later) speeds via the third SuperSpeed transmit pair B2, B3 and fourth SuperSpeed transmit pair A10, A11.

In addition, the port circuitry 110 includes a switch circuit 126, which may be a transistor-based switch using one or more FETs, BJTs, or other suitable transistors and voltage comparators. Since the other pin connections are already hard-wired to perform the respective master and slave functions, using the master unit 114 and slave unit 120, respectively, the switch circuit 126 is primarily used to indicate to the user which orientation the plug is currently arranged in, and to control the USB power switch 118. The switch circuit 126 receives signals from CC1 and CC2, indicating the specific configuration (or orientation). In response to CC1 and CC2, the switch circuit 126 is configured to illuminate a first LED 128 and to enable USB power switch 118 when CC1 is sensed for peripheral connect (e.g., when the plug is inserted in the first orientation) and is configured to illuminate a second LED 130 and to disable the USB power switch 118 when CC2 is sensed for host connect (e.g., when the plug is inserted in the second orientation).

Figure 8A:
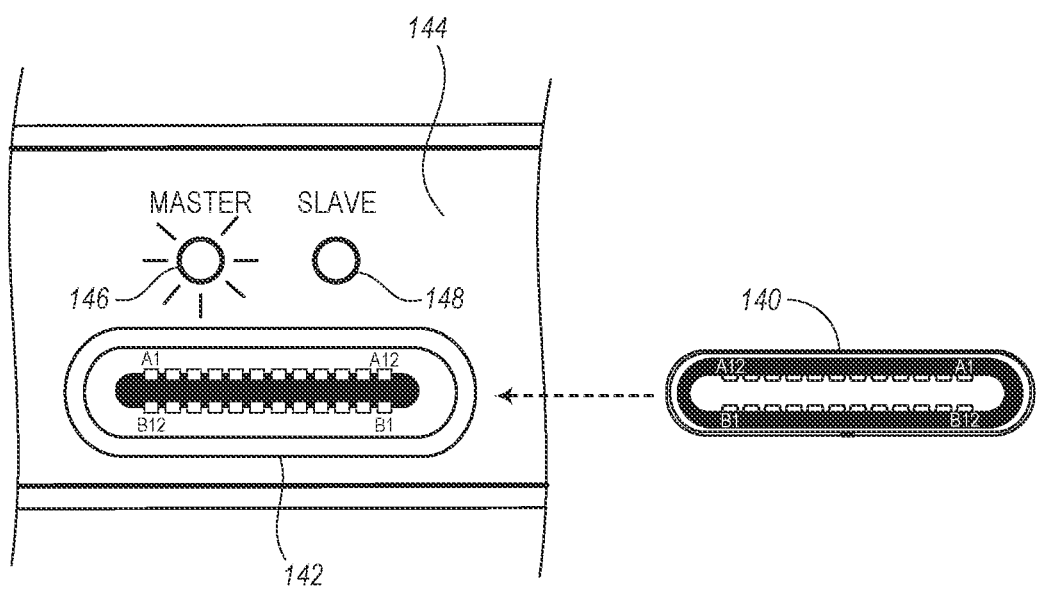
FIG. 8A is a diagram illustrating connection of a male plug of a first USB-C connector into a female receptacle of a second, compatible USB-C connector in a first orientation (top-side-up) to allow operation in a master mode, according to various embodiments.

FIG. 8A is a diagram illustrating connection of a male plug 140 of a first USB-C connector into a female receptacle 142 of a second, compatible USB-C connector, which is arranged in a housing 144 of an electronic device. The housing 144 is also configured to support a master LED 146 (e.g., LED 128) and a slave LED 148 (e.g., LED 130). As shown in FIG. 8A, the male plug 140 is inserted in a first orientation (top-side-up) where pins A1-A12 and B1-B12 of the male plug 140 come into contact with corresponding contacts A1-A12 and B1-B12 of the female receptacle 142 to allow operation in a master mode. It should be noted that the male plug 140 is shown from a front view, whereby inserting into the female receptacle 142 is illustrated in a "mirrored type" connection (as if the page is folded lengthwise). The connection in this first orientation (e.g., top-side-up) is designated in this embodiment as a master mode configuration and the master LED 146 is illuminated.

Figure 8B:
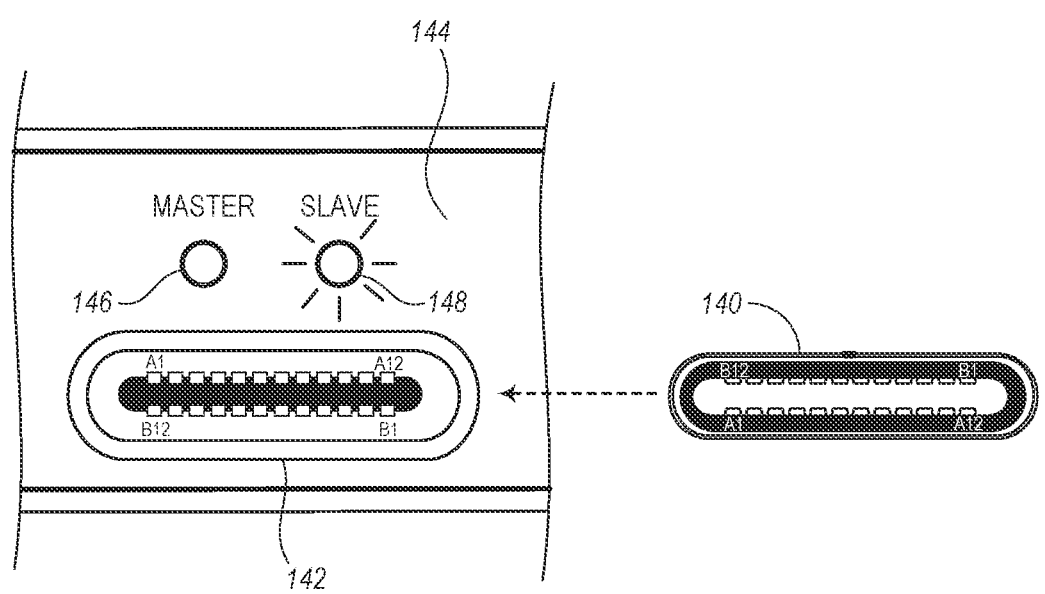
FIG. 8B is a diagram illustrating connection of a male plug of a first USB-C connector into a female receptacle of a second, compatible USB-C connector in a second orientation (top-side-down) to allow operation in a slave mode, according to various embodiments.

FIG. 8B is a diagram illustrating connection of the male plug 140 of the first USB-C connector into the female receptacle 142 of the second, compatible USB-C connector in a second orientation (top-side-down) to allow operation in a slave mode. As shown in FIG. 8B, the male plug 140 is arranged such that the B pins (i.e., B1-B12) are positioned at the top and the A pins (i.e., A1-A12) are positioned at the top in what may be referred to as a top-side-down orientation. In this orientation, the slave LED 148 is illuminated.

The description provides two LEDs, but those skilled in the art will appreciate there can be other approaches. In one implementation (as mentioned herein), either the master or slave LED will glow based on the orientation of the cable and user need to decide based on LED if he/she has plugged in the cable in right orientation. In another implementation, the master LED will glow only when the plugged in device is a slave and it is inserted in master configuration orientation. Similarly, slave led will glow only when the plugged in device is master and it is inserted in slave configuration orientation. In all other cases both the LEDs will be off. In a further implementation, there can be a single LED which has different visual indicators, e.g., different colors, only on when one mode is correct, etc. That is, the LEDs can be configured to visually distinguish modes based on a manner of operation, i.e., color, intensity, on/off, blinking, frequency of blinking, and combinations thereof.

Review of Dual-Function USB-C Connector and Circuitry

Therefore, the systems and methods of the present disclosure are configured to enable operation of connector circuitry (e.g., port circuitry 110, driver software, etc.) in a master mode (e.g., data port mode, host mode, control mode, etc.) when a plug of one connector is inserted into a receptacle of another connector in a first orientation and to enable operation of the connector circuitry in a slave mode (e.g., peripheral device mode, console mode, etc.) when the plug is inserted into the receptacle in a second orientation. For example, in one embodiment, port circuitry (e.g., port circuitry 110) may be associated with a receptacle of an electrical connector configured for connection with a compatible plug. The port circuitry may include a master unit (e.g., master unit 114) configured to one or more of transfer data to and supply power to the compatible plug when the compatible plug is inserted into the receptacle in a first orientation. The port circuitry may also include a slave unit (e.g., slave unit 120) configured to one or more of transfer data from and receive power from the compatible plug when the compatible plug is inserted into the receptacle in a second orientation.

In some embodiments, the receptacle and compatible plug may include a physical structure that allows the compatible plug to be inserted into the receptacle in either the first orientation or second orientation. For instance, the receptacle may include electrical contacts that conform to a USB-C layout and the compatible plug may include pins that conform to the USB-C layout. The port circuitry may be configured to utilize the master unit to operate in a master mode when the compatible plug is inserted into the receptacle and is configured to utilize the slave unit to operate in a slave mode when the compatible plug is inserted into the receptacle. The port circuitry may be configured to operate in either the master mode or slave mode without the need for a switching action by a multiplexer or other type of switch.

The port circuitry may further include a switching circuit (e.g., switch circuit 126) configured to illuminate a first LED when the compatible plug is inserted into the receptacle in the first orientation (to indicate that the port circuitry is operating in a master mode) and configured to illuminate a second LED when the compatible plug is inserted into the receptacle in the second orientation (to indicate that the port circuitry is operating in a slave mode). In the master mode, the switching circuit may be configured to enable a power source to supply power to the compatible plug. The switching circuit may be configured to receive one or more Configuration Channel (CC) signals from the receptacle in accordance with a USB protocol, wherein the one or more CC signals may indicate whether the compatible plug is inserted into the receptacle in the first orientation or second orientation.

According to some embodiments, the port circuitry may further include a bridge for converting USB data from the compatible plug to a UART format for interfacing to. The host unit may be configured to transfer data at a speed of at least 5 gigabits per second (e.g., USB 3.0 and later) and/or at USB2 speed and wherein the slave unit may be configured for data transfer at a speed of at least 480 megabits per second (e.g., USB 2.0 and later). The compatible plug may be connected to a cable for transmitting one or more of data and power between the electrical connector and an external device (e.g., external device 34), wherein the external device may be configured to act as a slave device when the compatible plug is inserted into the receptacle in the first orientation and may be configured to act as a master device when the compatible plug is inserted into the receptacle in the second orientation. The compatible plug may be configured in some implementations on a dongle having data storage capabilities, Wi-Fi communication capabilities, and/or Bluetooth communication capabilities. Also, the electrical connector may be arranged at an exterior surface of a housing of an electronic device and the port circuitry may be arranged within the housing of the electronic device.

Furthermore, the systems and methods of the present disclosure may be directed to a port assembly, which may include a receptacle of a connector (e.g., USB-C connector) and related circuitry and/or drivers. According to additional implementations, the systems and methods of the present disclosure may be directed to an electronic device (e.g., electronic device 10, 60, etc.) that includes a receptacle of a connector (e.g., USB-C connector) and related circuitry and/or drivers.

In a telecommunication system, it is common practice to utilize USB data ports for data storage and/or system upgrades and to use USB-based console ports. The standard USB Type-C (USB-C) connectors and console cables are a popular choice and are readily available in field.

Again, there are generally two separate types of USB-C port: a) data port for storage/upgrade and b) console port for management, configuration, and troubleshooting. However, since there are electronic products (e.g., smart phone, Network Elements (NEs), computers, etc.) which are cost sensitive and/or may have compact surfaces (e.g., faceplates) where USB connectors can be arranged, there can be limited space for both a data connector 62 and console connector 64 as shown in FIG. 3. At times, only one single USB connector can be accommodated on a device. The designation of data or console in FIG. 3 determines which is the host (e.g., master) and which is the peripheral device (e.g., slave). In a typical USB-C application (e.g., for a laptop), the USB-C port may be used to connect another device to the laptop, which, in this case, the other device would be the host, such as to provide firmware updates, charge a laptop battery, etc.

Telecommunications applications may include using the USB-C port as a craft interface on the faceplate of a Network Element (NE). Again, the current strategy is to have two ports, one labeled "data" and the other labelled "console" for various operations. The console port, for example, may be used when a technician wants to log into the NE for management purposes (e.g., connecting a laptop as a host or master with the NE being the USB peripheral device). The data port may be used for connecting a storage device to deliver upgrade software or to download logs or other info. Thus, both ports are needed in the conventional systems.

As mentioned earlier, a problem with the conventional systems is that space is limited on many types of electronic devices, particularly since devices tend to be designed with newer form factors having smaller sizes. For example, the USB-C port is considerably smaller than other types of connectors, such as those others shown in FIG. 1A. Often, the smaller form factors do not allow enough space to put a second USB-C port. Note, the present disclosure contemplates other applications in addition to telecommunications and the faceplate of an NE. Specifically, the approach described herein can be used anywhere where a given device can be both the master (host) or slave (device or peripheral). Again, the approach described herein saves space on the housing of the electronic device 10 as there is not a requirement for two different ports. Other applications may include energy (e.g., meters), medical devices, and the like. For example, with a meter or medical device, when configured as a host, where stats or diagnostics may be retrieved to an external storage device, and where configured as a device, a host may control or configure the device. Of course, the electronic device 10 can be any type of device and the telecom (NE), energy (meters), and medical devices are merely presented as examples.

Therefore, one goal of the present disclosure is to allow the USB-C form factor (and/or the form factors of other rotationally symmetrical connectors) to be used with multiple functionality. The systems and methods integrate the dual functionality (e.g., in accordance with USB 3.0 and later standards) for operating in data port and console port modes over a single standard USB-C connector. It may be noted that the current solutions do not require customization of the standard USB-C structure, pin layout, cable, or other physical aspects of the USB-C form factor.

According to some embodiments, the master LED 146 may be any suitable color (e.g., green) to indicate that the user has connected the cable in the USB data port orientation. The slave LED 148 may also be any suitable color (e.g., yellow) to indicate that the user has connected the cable in the USB console port orientation.

Configuration Channel (CC) pins are used to determine the presence of another USB connector device and to identify cable orientation on the board. Based on the orientation, the system will determine whether it is being used as USB data port or USB console port. Accordingly, it will either supply the +5V when in the USB data port mode or receive the +5V power when in the USB console port mode. The LEDs 146, 148 can provide an indication to the user.

It may also be noted that the present design is robust and will not cause any damage, even if user connects the cable in "wrong" orientation. With a single connector used for both USB console and data port functionality, it is possible for a manufacturer to reduce the cost of an extra connector. Also, such an arrangement allows for more space on a front or side panel of an electronic device, which can then be used to provide other interfaces, as needed, and can help to reduce the product size. In addition, the cost may be reduced by eliminating the multiplexer (e.g., USB-C multiplexer 98).

Therefore, the connector assemblies described herein are able to provide dual functionality (e.g., master or "data port" mode and slave or "console port" mode) over a single standard USB-C connector. This does not require any customization in the USB cable and associated connectors at the ends of the cable, and therefore a standard cable can be used. Conventional USB-C standards enable orientation-independent configurations, whereas the systems of the present disclosure are orientation-dependent. The present disclosure leverage the CC pins, which are used to detect orientation. Based on the orientation, the signals can be routed accordingly to enable two different modes of operation.

Also, the present disclosure is described with reference to USB-C for illustration purposes. Again, of note, the USB-C standard enables the connector to be two different orientations for the same operation. The present disclosure contemplates operation with other standards having similar functionality, namely ability to connect in different orientations, ability to detect the orientation, and, with the aspects described herein, the ability to provide different functionality based on the detected orientation.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. Port circuitry associated with a receptacle of an electrical connector configured for connection with a compatible plug, the port circuitry comprising:
   a master unit configured to one or more of transfer data to and supply power to the compatible plug when the compatible plug is inserted into the receptacle in a first orientation;
   a slave unit configured to one or more of transfer data from and receive power from the compatible plug when the compatible plug is inserted into the receptacle in a second orientation, inverted relative to the first orientation; and
   a switching circuit configured to detect orientation using orientation detection signals received via one or more pins of the receptacle, wherein the master unit and the slave unit are connected to orientation-specific contacts of the receptacle, the master unit being hard-wired to contacts engaged in the first orientation and the slave unit being hard-wired to different contacts engaged in the second orientation, without data-path multiplexing.

2. The port circuitry of claim 1, wherein the receptacle and compatible plug include a physical structure that allows the compatible plug to be inserted into the receptacle in either the first orientation or second orientation.

3. The port circuitry of claim 2, wherein the receptacle includes electrical contacts that conform to a Universal Serial Bus Type-C(USB-C) layout and the compatible plug includes pins that conform to the USB-C layout.

4. The port circuitry of claim 1, wherein the port circuitry is configured to utilize the master unit to operate in a master mode when the compatible plug is inserted into the receptacle in the first orientation and is configured to utilize the slave unit to operate in a slave mode when the compatible plug is inserted into the receptacle in the second orientation, and wherein the port circuitry is configured to operate in either the master mode or slave mode without use of the multiplexer.

5. The port circuitry of claim 1, wherein the switching circuit is further configured to illuminate a first LED when the compatible plug is inserted into the receptacle in the first orientation to indicate that the port circuitry is operating in a master mode and configured to illuminate a second LED or the first LED in a different manner when the compatible plug is inserted into the receptacle in the second orientation to indicate that the port circuitry is operating in a slave mode.

6. The port circuitry of claim 5, wherein, in the master mode, the switching circuit is further configured to enable a power source to supply power to the compatible plug.

7. The port circuitry of claim 5, wherein the switching circuit is configured to receive one or more Configuration Channel (CC) signals from the receptacle in accordance with a USB protocol, wherein the one or more CC signals indicate whether the compatible plug is inserted into the receptacle in the first orientation or second orientation.

8. The port circuitry of claim 1, further comprising a bridge for converting Universal Serial Bus (USB) data from the compatible plug to a Universal Asynchronous Receiver/Transmitter (UART) format for input to the slave unit.

9. The port circuitry of claim 1, wherein the master unit is configured to transfer data at a speed of at least 5 gigabits per second and wherein the slave unit is configured to receive data at a speed of at least 480 megabits per second.

10. The port circuitry of claim 1, wherein the compatible plug is connected to a cable for transferring one or more of data and power between the electrical connector and an external device, wherein the external device is configured to act as a slave device when the compatible plug is inserted into the receptacle in the first orientation and is configured to act as a master device when the compatible plug is inserted into the receptacle in the second orientation.

11. The port circuitry of claim 1, wherein the compatible plug is configured on a dongle having one or more of data storage capabilities, Wi-Fi communication capabilities, cellular communication capabilities and Bluetooth communication capabilities.

12. The port circuitry of claim 1, wherein the electrical connector is arranged on an exterior surface of a housing of an electronic device, and wherein the port circuitry is arranged within the housing of the electronic device.

13. A port assembly comprising:
a receptacle of an electrical connector having a plurality of contacts configured for connection with a plurality of corresponding pins of a compatible plug; and
circuitry connected to the plurality of contacts, the circuitry including
a master unit configured to one or more of transfer data to and supply power to the compatible plug when the compatible plug is inserted into the receptacle in a first orientation,
a slave unit configured to one or more of transfer data from and receive power from the compatible plug when the compatible plug is inserted into the receptacle in a second orientation, inverted relative to the first orientation, and
a switching circuit configured to detect orientation using orientation detection signals received via one or more pins of the receptacle, wherein the master unit and the slave unit are connected to orientation-specific contacts of the receptacle, the master unit being hard-wired to contacts engaged in the first orientation and the slave unit being hard-wired to different contacts engaged in the second orientation, without data-path multiplexing.

14. The port assembly of claim 13, wherein the receptacle and compatible plug include a physical structure that allows the compatible plug to be inserted into the receptacle in either the first orientation or second orientation.

15. The port assembly of claim 14, wherein the receptacle includes electrical contacts that conform to a Universal Serial Bus Type-C(USB-C) layout and the compatible plug includes pins that conform to the USB-C layout.

16. An electronic device comprising:
a housing;
a connector arranged in the housing to enable connection with a plug of a corresponding connector, the connector including a receptacle having a plurality of contacts configured for connection with a plurality of corresponding pins of the plug; and
circuitry including
a master unit configured to one or more of transfer data to and supply power to the plug when the plug is inserted into the receptacle in a first orientation,
a slave unit configured to one or more of transfer data from and receive power from the plug when the plug is inserted into the receptacle in a second orientation, inverted relative to the first orientation; and
a switching circuit configured to detect orientation using orientation detection signals received via one or more pins of the receptacle, wherein the master unit and the slave unit are directly connected to orientation-specific contacts of the receptacle, the master unit being hard-wired to contacts engaged in the first orientation and the slave unit being hard-wired to different contacts engaged in the second orientation, without data-path multiplexing.

17. The electronic device of claim 16, wherein the plurality of contacts and the plurality of corresponding pins conform to a Universal Serial Bus Type-C (USB-C) layout.

18. The electronic device of claim 16, wherein the switching circuit is further configured to illuminate a first LED when the plug is inserted into the receptacle in the first orientation to indicate that the circuitry is operating in a master mode and configured to illuminate a second LED or the first LED in a different manner when the plug is inserted into the receptacle in the second orientation to indicate that the circuitry is operating in a slave mode.

19. The electronic device of claim 18, wherein the switching circuit is further configured to receive one or more Configuration Channel (CC) signals from the receptacle in accordance with a USB protocol, wherein the one or more CC signals indicate whether the plug is inserted into the receptacle in the first orientation or second orientation.

20. The electronic device of claim 16, wherein the electronic device is a Network Element (NE) or mobile phone configured with Dual-Role-Data (DRD) capability to act as either a master device or a slave device.

* * * * *